United States Patent [19]
Krieg et al.

[11] Patent Number: 6,076,877
[45] Date of Patent: *Jun. 20, 2000

[54] ARRANGEMENT FOR THE VEHICLE-FIXED HOLDING OF CONTROL UNITS IN A MOTOR VEHICLE

[75] Inventors: Karl-Heinz Krieg, Erkenbrechtsweiler; Martin Krug, Karlsruhe, both of Germany

[73] Assignee: DaimlerChrysler AG, Stuttgart, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/912,786

[22] Filed: Aug. 18, 1997

[30] Foreign Application Priority Data

Aug. 16, 1996 [DE] Germany ............ 196 32 942

[51] Int. Cl.$^7$ .................................................. B60R 11/00
[52] U.S. Cl. .......................................... 296/37.1; 296/204
[58] Field of Search ................................ 296/37.1, 37.8, 296/37.15, 187, 204, 208

[56] References Cited

U.S. PATENT DOCUMENTS

| | | | |
|---|---|---|---|
| 2,465,770 | 3/1949 | Volsk ........................................ | 296/37 |
| 2,710,222 | 6/1955 | Barenyi ..................................... | 296/28 |
| 4,283,083 | 8/1981 | Johnson .................................. | 296/24 R |
| 4,847,733 | 7/1989 | Roy et al. . | |
| 4,898,419 | 2/1990 | Kenmochi et al. ..................... | 296/204 |
| 5,039,155 | 8/1991 | Suman et al. ......................... | 296/65.1 |
| 5,417,471 | 5/1995 | Kreis et al. ............................ | 296/194 |
| 5,611,593 | 3/1997 | Fukagawa et al. ..................... | 296/204 |
| 5,678,875 | 10/1997 | Zipperle et al. ....................... | 296/37.8 |
| 5,706,170 | 1/1998 | Glovatsky et al. .................... | 361/695 |
| 5,957,526 | 9/1999 | Gramer ................................. | 296/204 |

FOREIGN PATENT DOCUMENTS

| | | |
|---|---|---|
| 0448738A1 | 10/1991 | European Pat. Off. . |
| 2378433 | 8/1978 | France . |
| 2687887A1 | 8/1993 | France . |
| 3928138A1 | 2/1991 | Germany . |
| 4313782A1 | 11/1994 | Germany . |
| 19524165A1 | 8/1996 | Germany . |
| 0333267 | 9/1989 | Netherlands ........................ 296/37.15 |

OTHER PUBLICATIONS

Search Report, Europe, Aug. 5, 1998.

*Primary Examiner*—B. Dayoan
*Assistant Examiner*—Paul Chenevert
*Attorney, Agent, or Firm*—Evenson, McKeown, Edwards & Lenahan, P.L.L.C.

[57] ABSTRACT

Arrangement for the vehicle-fixed holding of control units in a motor vehicle. An electronic control unit carrier component is constructed as an essentially flatly designed sheet metal stamping. The control unit receiving areas are in each case arranged side-by-side on a top side as well as on a bottom side of the sheet metal stamping.

15 Claims, 2 Drawing Sheets

ARRANGEMENT FOR THE VEHICLE-FIXED HOLDING OF CONTROL UNITS IN A MOTOR VEHICLE

BACKGROUND AND SUMMARY OF THE INVENTION

This application claims the priority of German application 196 32 942.6-21 filed in Germany on Aug. 16, 1996, the disclosure of which is expressly incorporated by reference herein.

The invention relates to an arrangement for the vehicle-fixed holding of control units in a motor vehicle having a carrier component which is provided with receiving areas for positioning and fixing several different control units.

From German Patent Document DE 43 13 782 A1, an arrangement is known for the vehicle-fixed holding of control units which has a carrier component for holding electronic and electrotechnical control units. The carrier component has cooling ribs which permit an improved carrying-off of heat of the housings of the control units. For holding several control units, these are held in stacks on the carrier component. The carrier component is designed individually for the respectively provided number of control units. A simple conversion of the carrier component for receiving additional or differently designed control units is not possible.

German Patent Document DE 39 28 138 A1 discloses a carrier component in the form of a sheet metal stamping which is designed in a plate shape and in one piece. The sheet metal stamping has receiving areas for fixing a plug, on the one hand, and a socket, on the other hand, on the sheet metal stamping.

It is an object of the invention to provide an arrangement of the initially mentioned type which ensures an easy mountability and convertibility of control units of different types.

This object is achieved by the present invention in that the carrier component is constructed as an essentially flatly designed, plate-shaped and one-piece sheet metal stamping, and in that the receiving areas are in each case arranged side-by-side on a top side as well as on a bottom side of the sheet metal stamping. By means of the essentially flat design of the carrier component as a sheet metal stamping and the arrangement of the receiving areas on the sheet metal stamping side-by-side, a simple mounting and demounting of the control units is permitted since each receiving area is accessible in a simple manner to a corresponding control unit independently of the arrangement of the additional control units. The arrangement of the receiving areas on the sheet metal stamping side-by-side also permits a simple manufacturing-related machining of the sheet metal part depending on the requirements with respect to possible additional or differently designed receiving areas which, in a simple manner, permits a fast conversion for the arrangement of other or additional control units. The control units which are arranged on the top side as well as on the bottom side of the sheet metal stamping are easily accessible. Including the respectively provided control units, the carrier component can be preassembled outside the motor vehicle and can be installed in the motor vehicle as a completely preassembled unit. With respect to its function, the carrier component represents a base plate which permits a simple variation and conversion to the respective requirements. As a result of the solution according to the invention, the carrier component is particularly suitable for the holding of differently dimensioned control units for function arrangements which can be selected as optional equipment for the vehicle. As the result of the carrier component, an individual adaptation is possible to the respective customers' wishes, without the requirement of manufacturing respective separate holding devices.

As a development of the invention, the sheet metal stamping is fixed to a vehicle-fixed vehicle body component in the horizontal alignment. As a result, a simple accessibility of the control units is permitted also in the installed condition of the sheet metal stamping.

In a further development of the invention, the sheet metal stamping is held by means of a hinge arrangement swivellably on the vehicle-fixed vehicle body part. The swivellable arrangement ensures a simple accessibility of the control units on the top side as well as also of the control units on the bottom side of the sheet metal stamping. Therefore, particularly the cabling, which is carried out only after the mounting of the sheet metal stamping in the motor vehicle, as well as a subsequent exchange of the control units is simplified.

In a further development of the invention, fastening or holding elements are integrated on the receiving areas in the sheet metal stamping. In particular, it is therefore possible to press fastening nuts into the sheet metal stamping or to provide extruded holes.

In a further development of the invention, the sheet metal stamping can be positioned in the motor vehicle in the direct proximity of a cable duct which is fixed to the vehicle. For this purpose, suitable fastening points are arranged in the motor vehicle on the corresponding vehicle body part. The arrangement in the proximity of the cable duct ensures a simple cabling and a simple guiding of the cables.

In a further development of the invention, the sheet metal stamping can be positioned underneath a rear seat bench. This is a position which offers a sufficiently large installation space and, in addition, ensures a stable fastening on the adjacent vehicle body parts, particularly on a cross member of the vehicle body support structure.

In a further embodiment of the invention, the sheet metal stamping is made of an aluminum plate. The sheet metal stamping therefore has a lower weight.

Other objects, advantages and novel features of the present invention will become apparent from the following detailed description of the invention when considered in conjunction with the accompanying drawings.

DETAILED DESCRIPTION OF THE DRAWINGS

Figure 1:
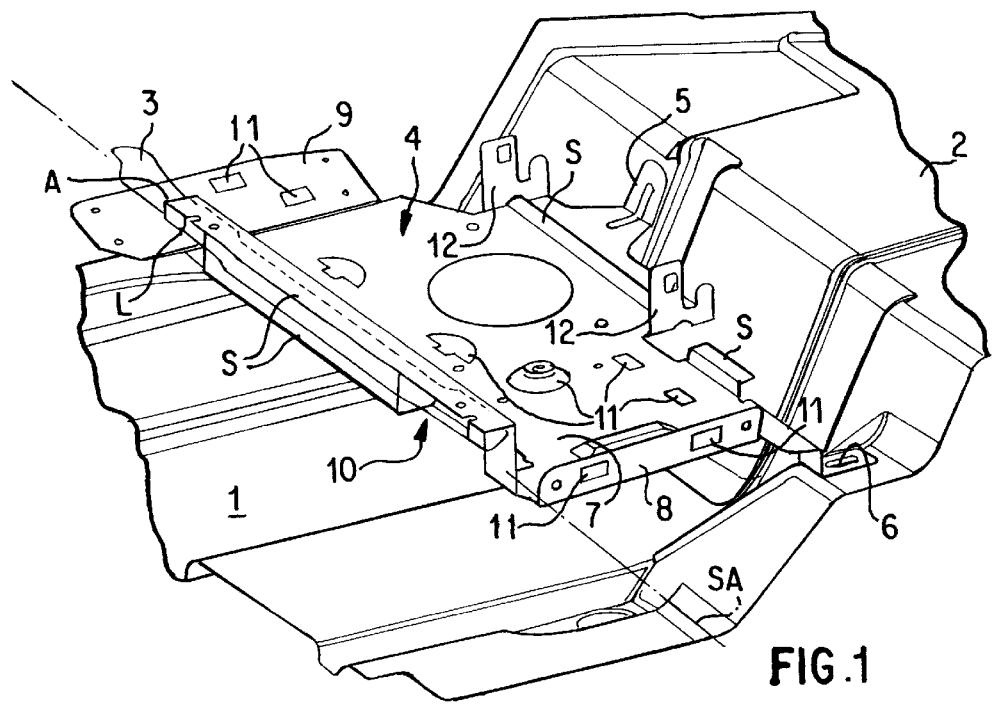
FIG. 1 is a perspective view of an embodiment of an arrangement according to a first preferred embodiment of the invention for the vehicle-fixed holding of control units on a vehicle floor below a rear seat bench.

An arrangement for the holding of electronic and electrotechnical control units in a motor vehicle has a carrier plate 4 as a carrier component which is produced in one piece as a sheet metal stamping from an aluminum plate. The carrier plate 4 has preferably several stiffening ribs and angles S, and two lug-type fastening flanges 5, 6 by means of which they can be releasably fixed at a vehicle floor 1, 2 of a passenger car which is partially shown in FIGS. 1 and 2. The carrier plate 4 is fastened on a stepped transition of the vehicle floor 1, 2 below a rear seat bench which is not shown.

In its condition fastened to the vehicle floor 1, 2, the carrier plate 4 is aligned horizontally and projects at a distance with respect to the lower vehicle floor part 1 from a steeply aligned transition wall between the lower and the upper vehicle floor part 1, 2 horizontally in the longitudinal direction of the vehicle toward the front. For the fastening of the carrier plate 4 on the vehicle body part in the form of the vehicle floor 1, 2, releasable screwed connections are provided.

The carrier plate 4 essentially has a flat design and, on its oppositely situated sides, has an upwardly bent holding angle 8, on the one hand, and, on the other hand, a downwardly stepped and diagonally outwardly bent receiving flange 9. On the top side 7 of the carrier plate 4 as well as on an only outlined bottom side 10 of the carrier plate 4, different fastening and holding elements 11, 12 are provided which, in each case, are integrated in one piece on the carrier plate 4. The fastening and holding elements are positioned in receiving areas for different electronic and electrotechnical control units 13 to 19 (FIG. 3) and are used for the releasable fastening of these control units 13 to 19 on the top side 7 and the bottom side 10 as well as on the lateral holding angle 8 and the opposite receiving flange 9 of the carrier plate 4. The fastening elements 11 may have pressed-in fastening nuts or extruded holes in order to permit the direct screwing-in of corresponding screw elements for the releasable fastening of the control units 13 to 19.

In the illustrated embodiment, the control unit 13 represents a memory unit for the electric seat adjustment; the control unit 14 is a transceiver unit; and the control unit 15 represents a unit for the voice operation of a certain function component. The control unit 16 is used for controlling an emergency call device. Control unit 17 is used for controlling corresponding parking aids; and control unit 18 represents an arbitrary optional unit. Control unit 19 is a tilt generator which is used particularly for a rollover bar function of the passenger car.

In the case of the illustrated embodiment, control units 13 and 14 as well as 19 are mounted on the top side 7 of the carrier plate 4. Control units 16 and 17 are fastened on the bottom side 10 of the carrier plate 4. Control unit 15 is fastened on the holding angle 8 and control unit 18 is fastened on the receiving flange 9. As the result of the described fastening of the different control units, each control unit 13 to 19 is separately accessible in a simple manner for the mounting and demounting because all control units 13 to 19 are in each case arranged side-by-side on one side of the carrier plate 4.

Figure 2:
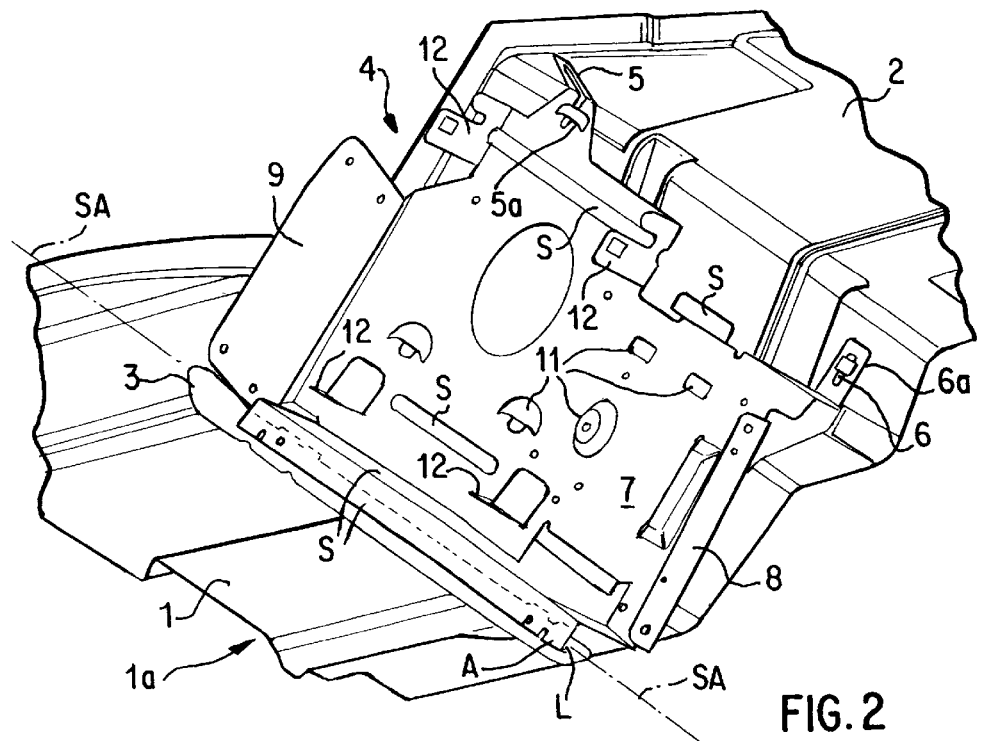
FIG. 2 is a perspective view of a carrier component of an arrangement according to a second preferred embodiment of the invention in a position folded away in the downward direction.
Figure 3:
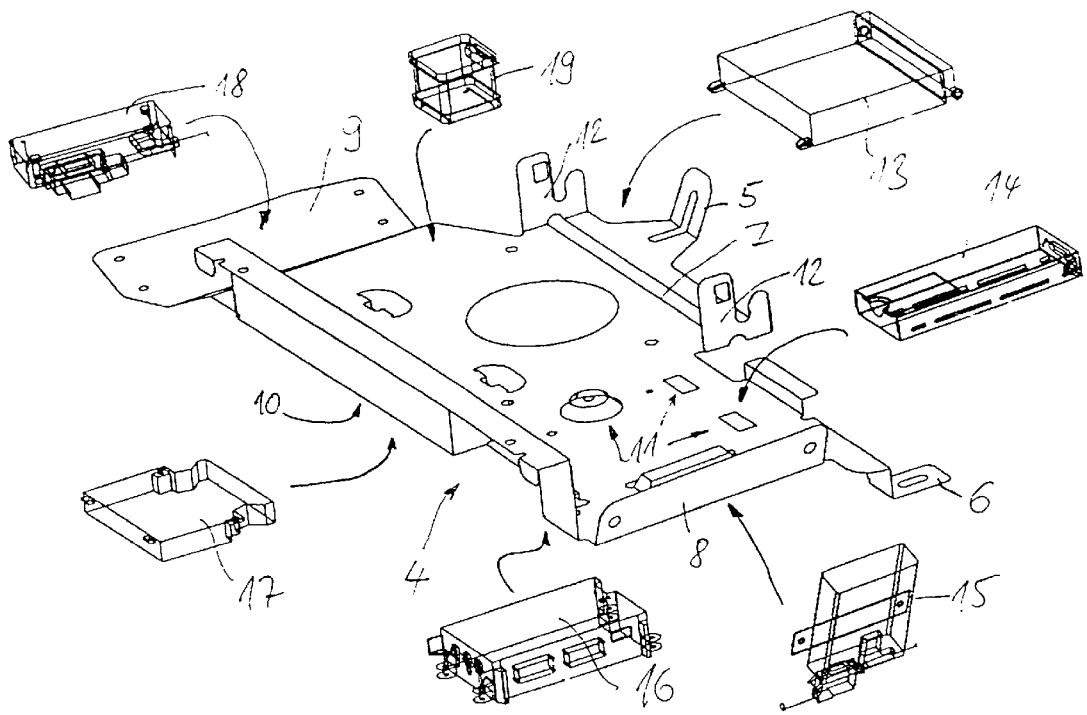
FIG. 3 is a perspective, partly exploded view of the carrier component of the arrangement according to FIGS. 1 and 2 with several control units which can be fixed on the carrier component.

Carrier plate 4 according to FIG. 2 corresponds essentially to carrier plate 4 according to FIGS. 1 and 3. The same reference numbers were used for all identical parts of the carrier plate 4. However, the important difference with respect to the carrier plate 4 is the type of fastening on the vehicle floor 1. On a front side of the carrier plate 4, a cross member flange 3, having a pair of recesses A which is shown only by a broken line, is connected with the carrier plate 4 by lugs L which are inserted into recesses A in such a manner that carrier plate 4 is held swivellably about the longitudinal axis SA of the cross member flange 3, that is, transversely to the longitudinal direction of the vehicle. The cross member flange 3 is fastened on the vehicle floor 1. In its functional position, the carrier plate 4 is placed against the upwardly stepped transition wall of the vehicle floor 1, 2 and therefore projects in the longitudinal direction of the vehicle diagonally rearward and upward. In this functional position, it is locked by means of fixing devices 5a and 6a. In order to make the bottom side of the carrier plate 4 accessible, the carrier plate 4 can be swivelled in a simple manner about the longitudinal axis of the cross member flange 3 toward the front, whereby corresponding control units can be mounted or demounted on the bottom side of the carrier plate 4.

In the two embodiments according to FIGS. 1 to 3, the carrier plate 4 is arranged in the direct vicinity of a cable duct 7a so that a cable guiding of the control units of the carrier plate 4 to the cable duct can take place in a simple manner. The cabling is considerably simplified by this direct arrangement of the carrier plate 4 on the cable duct.

In an embodiment of the invention which is not shown, the carrier plate 4 is arranged analogously to the representation of FIG. 3 in a horizontal manner and projects away from the transition wall between the lower vehicle floor part 1 and the upper vehicle floor part 2. However, in this embodiment, the carrier plate 4 is fastened by means of a hinge arrangement such on the transition wall that, although a horizontal functional position of the carrier plate 4 can be achieved, the carrier plate 4 can be swivelled upwards for the simple accessibility of the bottom side 10 of the carrier plate 4.

In order to convert the carrier plate 4 for receiving additional or other control units, because of the flat design of the carrier plate, a simple machining can be carried out by means of corresponding bending or cutting tools. Because of the easy machinability and the resulting simple convertibility, optional equipment in the case of motor vehicles can be taken into account at low expenditures because additional receiving areas or the changing of existing receiving areas on the carrier plate for corresponding control units can be implemented in a simple manner.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for holding control units fixedly in a motor vehicle comprising a carrier plate which is provided with receiving areas and holding elements for positioning and fastening several different control units, wherein the carrier plate is an essentially flatly designed plate-shaped and single-piece sheet metal stamping pivotably connected to the vehicle, and wherein the receiving areas and holding elements are in each case arranged side-by-side on a top side as well as on a bottom side of the sheet metal stamping.

2. An arrangement according to claim 1, wherein the sheet metal stamping is fixed on a vehicle-fixed body part in a horizontal alignment.

3. An arrangement according to claim 2, wherein fastening or holding elements are integrated in the sheet metal stamping on the receiving areas.

4. An arrangement according to claim 3, wherein the sheet metal stamping is provided with stiffening angles and stiffening ribs.

5. An arrangement according to claim 2, wherein the sheet metal stamping can be positioned in the motor vehicle in direct proximity of a vehicle-fixed cable duct.

6. An arrangement according to claim 5, wherein the sheet metal stamping is provided with stiffening angles and stiffening ribs.

7. An arrangement according to claim 6, wherein the sheet metal stamping is made of an aluminum plate.

8. An arrangement according to claim 2, wherein the sheet metal stamping is provided with stiffening angles and stiffening ribs.

9. An arrangement according to claim 5, wherein the sheet metal stamping is made of an aluminum plate.

10. An arrangement according to claim 1, wherein fastening or holding elements are integrated in the sheet metal stamping on the receiving areas.

11. An arrangement according to claim 10, wherein the sheet metal stamping is provided with stiffening angles and stiffening ribs.

12. An arrangement according to claim 1, wherein the sheet metal stamping can be positioned in the motor vehicle in direct proximity of a vehicle-fixed cable duct.

13. An arrangement according to claim 1, wherein the sheet metal stamping is made of an aluminum plate.

14. An assembly which accommodates selective mounting of a plurality of electronic component control units in a motor vehicle having with adjoining upper and lower floor sections, said assembly comprising:

a one-piece sheet metal stamping having electronic component control unit receiving areas having holding elements arranged side-by-side on both sides of said stamping, and an attachment structure pivotally attaching said stamping in the vehicle with said stamping extending from an upper floor section over a lower floor section.

15. An assembly according to claim 14, wherein said attachment structure includes openings in said sheet metal stamping for accommodating fasteners engageable in at least one of the floor sections.

* * * * *